(12) United States Patent
Saunders et al.

(10) Patent No.: US 6,983,015 B1
(45) Date of Patent: Jan. 3, 2006

(54) SIGNAL PROCESSOR

(75) Inventors: Nicholas Ian Saunders, Basingstoke (GB); Robert Mark Stefan Porter, Maidenhead (GB)

(73) Assignee: Sony United Kingdom Limited, Weybridge (GB)

( * ) Notice: Subject to any disclaimer, the term of this patent is extended or adjusted under 35 U.S.C. 154(b) by 734 days.

(21) Appl. No.: 09/645,748

(22) Filed: Aug. 24, 2000

(30) Foreign Application Priority Data

Aug. 26, 1999 (GB) ................... 9920274

(51) Int. Cl.
*H04N 7/12* (2006.01)
(52) U.S. Cl. ................ 375/240.1; 348/419.1
(58) Field of Classification Search ............ 375/240.1, 375/240.12, 240.23, 240.25, 240.26; 348/715, 348/419.1
See application file for complete search history.

(56) References Cited

U.S. PATENT DOCUMENTS

| 5,929,916 A * | 7/1999 | Legall et al. .......... 375/240.05 |
| 6,567,471 B1 * | 5/2003 | Yoshinari ............... 375/240.26 |
| 6,611,624 B1 * | 8/2003 | Zhang et al. ............... 382/232 |

FOREIGN PATENT DOCUMENTS

| EP | 0 755 157 | 1/1997 |
| EP | 0 923 243 A1 | 6/1999 |
| EP | 0 930 786 | 7/1999 |

(Continued)

Primary Examiner—Gims Philippe

(74) *Attorney, Agent, or Firm*—Frommer Lawrence & Haug LLP; William S. Frommer

(57) ABSTRACT

Decoders A and B decode MPEG-2 bitstreams A and B. A switch (S1) switches from decoded stream A to decoded stream B to achieve a splice. The resulting bitstream is re-encoded in an encoder 4. A new transitional GOP is defined beginning at the splice. The new GOP is defined by picture type decision rules which may have the effect of changing the GOP compared to the GOPs of streams A and B. The new GOP provides an initial prediction of the position in stream B where the occupancy value of stream C should coincide with that of B. A target for the new number of bits in the new GOP is calculated as the sum of the normal allocation of bits for the new GOP plus the difference between the occupancy value of stream C at the splice and a prediction of the occupancy of stream B at the predicted position. The occupancy value of stream C is controlled in accordance with the target so that it tends towards the occupancy value of stream B at the predicted position.

The target is updated regularly throughout the GOP on I and P frames. After the first update at the beginning of the transitional GOP, the target changes at the updates nominally by an amount VBV_diff which is the difference between occupancy of bit stream B on the current I or P frame and the occupancy at the next I or P frame. If VBV-diff is negative, the amount of change is limited to a limit value. The maximum value of the limit may be exceeded only once and the limit is then set to zero. The excess of VBV_diff over the limit is a value reduction_carry. Reduction carry is monitored, and if at the end of the transitional GOP it exceeds a threshold (e.g. zero), another transitional GOP is started. If VBV_diff is negative but does not exceed the limit, the target is reduced by VBV_diff and the limit is reduced by a proportion of VBV_diff. If VBV_diff is positive, then VBV_diff is averaged out over the target values for the remaining I and P frames in the GOP.

40 Claims, 13 Drawing Sheets

FOREIGN PATENT DOCUMENTS

| WO | WO 96/17492 | 6/1996 |
| WO | WO 97/08898 | 3/1997 |
| WO | WO 98/44737 | 10/1998 |
| WO | WO 99/05870 | 2/1999 |

* cited by examiner

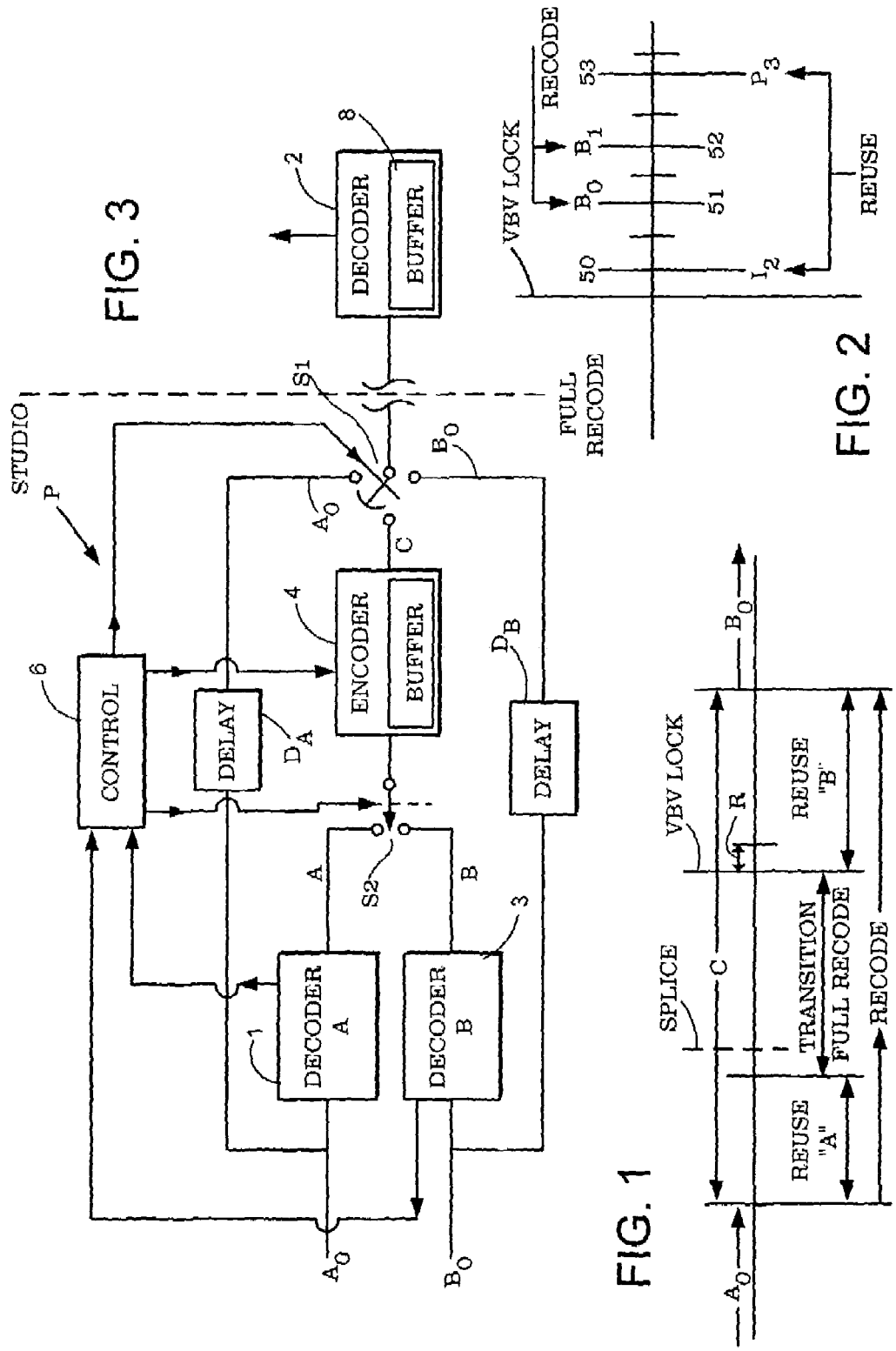

FIG. 7

DISPLAY ORDER, SHOWING PICTURE TYPE DECISIONS

| FRAME No.: | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| STREAM $A_0$: | B | B | I | B | B | P | B | B | P | B | B | P | B | B | I | B | B | P | B | B | P | B | B | P |
| STREAM $B_0$: | • | • | | B | B | P | B | B | P | B | B | P | B | B | I | B | B | P | B | B | P | B | B | P |
| STREAM C: | B | B | I | B | B | P | B | B | P | B | B | P | B | B | I | B | B | P | B | B | P | B | B | P |
| STREAM C': | B | B | I | B | B | P | B | B | P | B | B | P | B | B | I | B | B | P | B | B | P | B | B | P |
|  | (1) |  |  |  |  |  |  |  |  |  |  |  |  |  |  |  |  |  |  |  |  |  |  |  |

SPLICE POINT

| FRAME No.: | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 |
|---|---|---|---|---|---|---|---|---|---|---|---|---|---|---|---|---|---|---|---|---|---|---|---|---|
| STREAM $A_0$: | B | B | I | B | B | (P | B | B | P | B | B | P | B | B | I | B | B | P | B | B | P | B | B | P) |
| STREAM $B_0$: | B | P | B | B | B | I | B | B | P | B | B | P | B | B | I | B | B | P | B | B | P | B | B | P |
| STREAM C: | B | B | I | B | B | B | B | B | P | B | B | P | B | B | I | B | B | P | B | B | P | B | B | P |
| STREAM C': | B | B | P | B | B | I | B | B | P | B | B | P | B | B | P | B | B | P | B | B | P | B | B | P |
|  | (2) |  |  |  | (3) |  |  |  |  |  |  |  |  |  | (4) |  |  |  |  |  |  |  |  |  |

```
FRAME No.:  48 49 50 51 52 53 54 55 56 57 58 59 60 61 62 63 64 65 66 67 68 69 70 71
(STREAM A₀:  B  B  I  B  B  B  P  B  B  B  P  B  B  B  P  B  B  B  P  B  B  B  P  B  B  P)
 STREAM B₀:  B  P  B  B  I  B  B  P  B  B  B  P  B  B  B  I  B  B  P  B  B  P  B  B  P  B
 STREAM C :  B  B  I  B  B  B  P  B  B  B  P  B  B  B  P  B  I  B  B  B  P  B  B  P  B  B
 STREAM C':  B  P  B  B  I  B  P  B  P  B  B  P  B  B  B  I  B  P  B  P  B  P  B  P  B  P
             **********|
              VBV LOCK
```

```
FRAME No.: 72 73
STREAM A₀:  ·  ·
STREAM B₀:  B  P
STREAM C :  B  P
STREAM C':  B  P
```

· = REUSE
* = RECODE (TRANSITION PERIOD)

STREAM C' = FINAL STREAM C (AFTER PICTURE TYPE DECISIONS)
(1), (2), (3), (4) = PICTURE TYPE DECISIONS MADE AT THESE FRAMES

PROCESSING ORDER, AS SHOWN ON VBV OCCUPANCY GRAPHS

| FRAME No.: | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| STREAM A : | I | B | B | P | B | B | P | B | B | P | B | B | P | B | B | I | B | B | P | B | B | P | B | B |
| STREAM B : | • | • | I | B | B | P | B | B | P | B | B | P | B | B | I | B | B | P | B | B | P | B | B | P |
| STREAM C': | I | B | B | P | B | B | P | B | B | P | B | B | P | B | B | I | B | B | P | B | B | P | B | B |
| DISP C': | 2 | 0 | 1 | 5 | 3 | 4 | 8 | 6 | 7 | 11 | 9 | 10 | 14 | 12 | 13 | 17 | 15 | 16 | 20 | 18 | 19 | 23 | 21 | 22 |

SPLICE POINT

| FRAME No.: | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 |
|---|---|---|---|---|---|---|---|---|---|---|---|---|---|---|---|---|---|---|---|---|---|---|---|---|
| STREAM A : | I | B | B | P | B¹ | B¹ | P | B | B | P | B | B | I | B | B | P | B | B | P | B | B | P | B | B |
| STREAM B : | B | B | I | B | B¹ | (B | P | B | B | P | B | B | I | B | B | P | B | B | P | B | B | P | B | B) |
| STREAM C': | P | B | B | P | B¹ | I | B | B | P | B | B | P | B | B | I | B | B | P | B | B | P | B | B | P |
| DISP C' : | 26 | 24 | 25 | 28 | 27 | 31 | 29 | 30 | 34 | 32 | 33 | 37 | 35 | 36 | 40 | 38 | 39 | 43 | 41 | 42 | 46 | 44 | 45 | 49 |

| FRAME No.: | 48 | 49 | 50 | 51 | 52 | 53 | 54 | 55 | 56 | 57 | 58 | 59 | 60 | 61 | 62 | 63 | 64 | 65 | 66 | 67 | 68 | 69 | 70 | 71 |
|---|---|---|---|---|---|---|---|---|---|---|---|---|---|---|---|---|---|---|---|---|---|---|---|---|
| STREAM A: | (I | B | B | P | B | B | P | B | B | P | B | B | I | B | B | P | B | B | P | B | B | P | B | B) |
| STREAM B: | B | B | I | B | B | P | B | B | P | B | B | P | B | B | I | B | B | P | B | B | P | B | B | P |
| STREAM C': | B | B | I | B | B | P | - | - | - | - | - | - | - | - | - | - | - | - | - | - | - | - | - | - |
|  | * | * | * | * | * | * | * | * | * | * | * |  |  |  |  |  |  |  |  |  |  |  |  |  |
| DISP C': | 47 | 48 | 52 | 50 | 51 | 55 | 53 | 54 | 58 | 56 | 57 | 61 | 59 | 60 | 64 | 62 | 63 | 67 | 65 | 66 | 70 | 68 | 69 | 73 |

VBV LOCK

| FRAME No.: | 72 | 73 |
|---|---|---|
| STREAM A: | • | • |
| STREAM B: | B | B |
| STREAM C': | B | B |
|  | - | - |
| DISP C | 71 | 72 |

- = REUSE

\* = RECODE (TRANSITION PERIOD)

FRAME No. = PROCESSING ORDER FRAME No.
DISP C' = DISPLAY ORDER FRAME No. FOR STREAM C

FIG. 8 CONT'D

SIGNAL PROCESSOR

BACKGROUND OF THE INVENTION

1. Field of the Invention

The present invention relates to a signal processor. The invention concerns, joining referred to herein as splicing, digital bit streams which are compressed. Embodiments of the invention described herein are concerned with splicing digital video bitstreams which are compressed according to the MPEG-2 standard.

2. Description of the Prior Art

The invention and its background will be discussed by way of example with reference to MPEG-2 video bitstreams. However the invention is not limited to MPEG-2.

MPEG-2 is well known from for example ISO/IEC/ 13818-2, and will not be described in detail herein. Splicing of video is well known. It is used in editing video. Splicing analogue signals is relatively straight forward and can be done at the boundary between adjacent frames, because each analogue frame contains the whole of the video information of that frame independently of other frames. (Splicing can be done similarly in the digital domain for both compressed and uncompressed video data if all frames contain the whole video information of the frame.) MPEG-2 compressed video comprises groups of I, P and/or B frames known as GOPs, Groups of Pictures. I, P and B frames are well known. An I or Intra-encoded frame contains all the information of the frame independently of any other frame. A P frame in a GOP ultimately depends on an I frame and may depend on other P frames. A B frame of a GOP ultimately depends on an I-frame and may depend on P frames in the GOP. A B frame must not depend on another B frame.

A GOP typically comprises 12 or 15 frames comprising at least one I frame and several P and B frames. To correctly decode a GOP requires all the frames of the GOP, because a large part of the video information required to decode a B frame in the GOP is in a preceding and/or succeeding frame of the GOP. Likewise a large part of the video information required to decode a P frame is in a preceding frame of the GOP.

Thus if two different bit streams are spliced together in the compressed domain, the information necessary to decode frames each side of the splice point is likely to be lost.

Many papers have been written concerning the splicing of compressed bitstreams, which is a well known problem in MPEG. A paper "Flexible Switching and editing of MPEG-2 Video Bitstreams" by P. J. Brightwell, S. J. Dancer and M. J. Knee was published in "Atlantic Technical Papers 1996/ 1997" the preface to which is dated September 1997.

The paper discusses the problems of splicing MPEG-2 Video Bitstreams. Two bitstreams A and B to be spliced are decoded in respective decoders. A coder is switched from the decoder of A to the decoder of B at the splicing point. It discloses that near a splicing point where a bitstream A is replaced by a bitstream B, the following modifications are made.

"The picture type may be changed to provide a more suitable refresh strategy around the switch point. In the example below, the first P-frame in bitstream B after the switch is converted to an I-frame to provide a full refresh early in the new scene. Also, bitstream A contains an I-frame just before the switch point—as this is unnecessary, it is recoded as a P-frame to save bits.

|  |  |  |  |  | Switch point |  |  |  |  |  |  |
|---|---|---|---|---|---|---|---|---|---|---|---|
| Bitstream A: | P | B | B | I | \| ... |  |  |  |  |  |  |
| Bitstream B: |  |  |  | ... \| | B | P | B | B | P | B | B | P |
| Modified | P | B | B | P | \| B | I | B | B | P | B | B | P |

Prediction modes and motion vectors may require modification to take into account any changes in the picture type on recoding, or to prevent any predictions being made across the switch on recoding. In the example above, mac rob locks that originally used forward or bi-directional prediction for the B-frame following the switch point will be recoded using intra mode and backward prediction respectively. In addition, vectors are required for the I-frame that is recoded as a P-frame—these can be estimated from the vectors in surrounding frames, or taken from I-frame concealment vectors that many MPEG-2 bitstreams carry.

The quantisation parameters will be changed as part of the recoder's rate control strategy. As in a conventional coder, this aims to control the buffer trajectory of a downstream decoder to prevent under- or overflow, and to maintain the picture quality as high as possible. In addition, the rate control algorithm for the ATLANTIC switch uses the vbv_delay values in bitstreams A an B (which are carried in the info-bus) to make the buffer trajectory for the switched bitstream identical to that for bitstream B (i.e. the one being switched to) at some future time. Depending on the relative vbv_delay values, this may happen soon after the switch, or a recovery period of a few GOPs may be required. When it has been achieved, the recoder's quantisation parameters are locked to those of bitstream B, and the switch becomes transparent.

The quantisation parameters may also be changed to take advantage of effect know as temporal masking. This refers to the eye's inability to see moderate or even large amounts of noise around a scene change—typically 5 dB of degradation in the frame after the switch cannot be seen—and allows the number of bits used for the frames very close to the switch point to be reduced, allowing a shorter recovery period."

"Vbv-delay values" are measures of the number of bits in the buffer of the down stream decoder. The manner in which the "buffer trajectory" for the switched bitstream is made identical to that for bitstream B is not disclosed in the paper. It has been found in experiments by the present inventors that splicing bitstreams which have very large differences in VBV-delay values is problematic.

It is desirable to make the buffer trajectory for the switched bit stream identical to that for the bitstream B (referred to herein as VBV_lock) even where the difference between the vbv-delay values of the streams is large.

SUMMARY OF THE INVENTION

According to the present invention, there is provided a signal processor for splicing a compressed bitstream $B_0$ to a compressed bitstream $A_0$, comprising a decoder for decoding the bitstreams $A_0$ and $B_0$, a switch coupled to the decoder for producing a spliced bitstream S, comprising data from bitstream $B_0$ spliced to data from bitstream $A_0$, at a splice point, an encoder for re-encoding the spliced bitstream S to form a re-encoded spliced bitstreamC for supply to a downstream decoder having a downstream buffer, wherein the encoder is controlled over a transitional region so that the occupancy of the downstream buffer varies over the transitional region from the occupancy of bitstream $A_0$ to the occupancy of bitstream $B_0$ according to a trajectory in which the rate of change or occupancy is limited to a predetermined maximum rate.

By limiting the rate of change of occupancy, and preferably by limiting the maximum change made at predetermined intervals, the downstream buffer neither under- nor over-flows. Furthermore limiting the rate of change more evenly distributes the bits over the transitional region. In the preferred embodiments of the invention in which the data carried by the bitstreams is compressed video, the even distribution of bits creates a consistent signal to noise ratio across the transitional region.

It is also desired to determine whether VBV lock is achieved or not at the end of the transitional region and whether to extend the transitional region if VBV lock has not been achieved or has not been achieved precisely According to another aspect of the invention, there is provided a signal processor for splicing a compressed bitstream $B_0$ to a compressed bitstream $A_0$, each bitstream comprising groups (GOPS) of I, and P and/or B frames comprising decoder for decoding the bitstreams $A_0$ and $B_0$, a switch coupled to the decoder for producing a spliced bitstream S, comprising data from bitstream $B_0$ spliced to data from bitstream $A_0$ at a splice point (SPLICE), and encoding means encoder for re-encoding the spliced bitstream S to form a re-encoded spliced bitstream C for supply to a downstream decoder having a downstream buffer, wherein the encoder is controlled over a transitional region so that the occupancy of the downstream buffer varies over the transitional region from the occupancy of bitstream $A_0$ to the occupancy of bitstream $B_0$, the transitional region includes a transitional GOP extending from the splice point and of a length which is an initial prediction of the point in bitstream $B_0$ at which the occupancy of re-encoded spliced bitstream C equals that of bitstream $B_0$, and occupancy is changed at regular intervals in the GOP according to a trajectory so as to make the occupancy of re-encoded spliced bitstream C equal to that of bitstream $B_0$ by the end of the GOP, a limit is applied to a change according to the trajectory which increases occupancy, and the amount by which a change would exceed the limit (if it were not limited) is compared at the end of the GOP with a threshold and, if it exceeds the threshold, the transitional region is extended.

By monitoring the amount (reduction_carry) by which a change would exceed the limit and comparing it to the threshold, the encoding means can determine when VBV_lock is achieved or not. This allows lock to be achieved with large differences in occupancy between the bitstreams A and B. Preferably, if the limit is not exceeded, the limit is progressively reduced as the GOP proceeds. That prevents large changes at the end of the GOP. Preferably, if a change reduces occupancy, it is averaged (carry_over) over the remainder of the GOP to offset any increases which may occur later in the GOP. In an embodiment, if lock is not exactly achieved stuffing bits are added to the transitional GOP to achieve precise lock.

BRIEF DESCRIPTION OF THE DRAWINGS

The above and other objects, features and advantages of the invention will be apparent from the following detailed description of illustrative embodiments which is to be read in connection with the accompanying drawings, in which:

FIG. 1 is a time chart illustrating the splicing of a bitstream $B_0$ to a bitstream $A_0$ in accordance with a first example of the present invention;

FIG. 2 illustrates a portion R of the chart of FIG. 1 in more detail;

FIG. 3 is a schematic block diagram of an illustrative signal processor according to the present invention and operating as illustrated in FIGS. 1 and 2;

FIG. 7 shows illustrative GOPs in display order and the application of illustrative picture type decisions;

FIG. 8 shows the GOPs of FIG. 4 in processing order;

DESCRIPTION OF THE PREFERRED EMBODIMENTS

Transcoding Parameters

Figure 4:
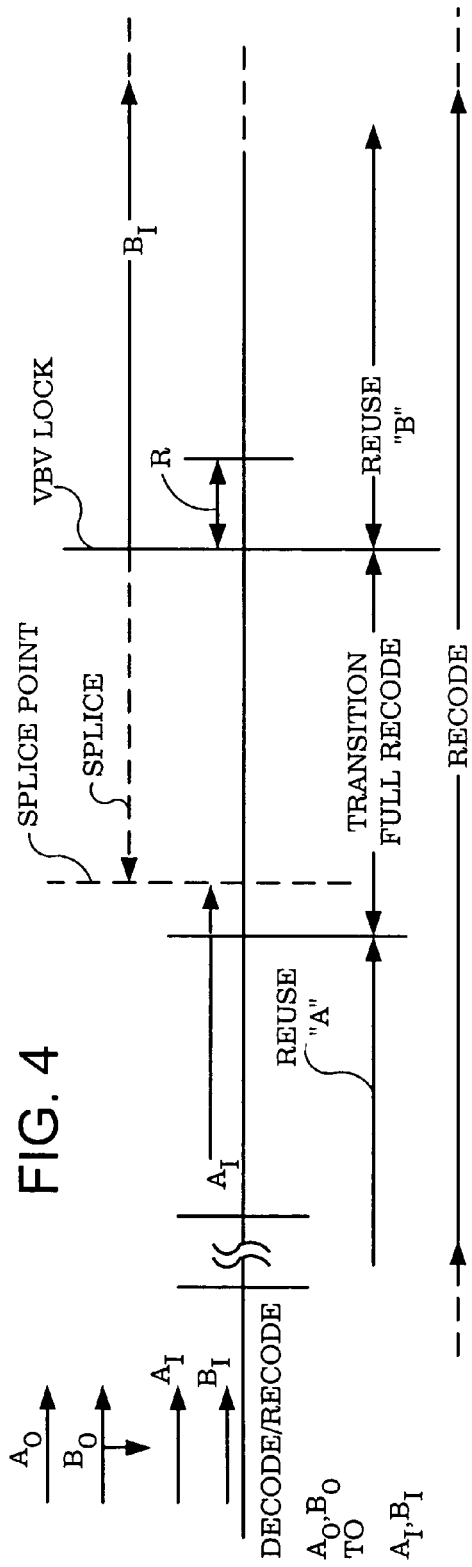
FIG. 4 is a time chart illustrating the splicing of a bitstream $B_0$ to a bitstream $A_0$ in accordance with a second example of the present invention.

I frames have the following transcoding parameters which are well known in MPEG.

DCT_Type, Q and Q_Matrix which are reused in embodiments of the present invention described hereinbelow. These parameters are reused in the recoding of I frames with reuse of parameters.

P and B frames have the parameters DCT_Type, Q, Q_Matrix, Pred_Type, MB_Mode and Motion Vectors. These parameters are reused in the recoding of P and B frames with reuse of parameters. These parameters are recalculated when fully recoding all frames.

FIRST EXAMPLE

Referring to FIGS. 1, 3 and 7, two bitstreams $A_0$ and $B_0$ are MPEG-2 encoded with GOPs comprising 12 frames. In this example the bitstreams $A_0$ and $B_0$ have the same GOP structure:

IBBPBBPBBPBB as shown in FIG. 7. However the bitstreams may have any other GOP structure allowed by MPEG-2. The two bitstreams $A_0$ and $B_0$ may have different GOP structures. For ease of explanation it is assumed the bitstreams $A_0$ and $B_0$ have the same GOP structure as shown in FIG. 7.

It is desired to replace bitstream $A_0$ by bitstream $B_0$. As shown in FIG. 1, initially $A_0$ is provided to the processor. It is routed in the processor P of FIG. 3 from input $A_0$ to contact $A_0$ of switch Si where it is fed, unchanged to, for example, a downstream decoder 2. In decoder 2 it is decoded for display. Downstream decoder 2 may be in, for example, a domestic television receiver. Processor P may be in a studio.

When an operator decides to splice bitstreams $B_0$ and $A_0$, the operator operates the switch S1 and a switch S2 so that $A_0$ is routed through decoder A, encoder 4 and via contact C of switch S1 to the downstream decoder 2.

The bitstream $A_0$ is decoded in decoder A and re-encoded in encoder 4. The MPEG-2 parameters are derived from the decoder A by a control processor 6 and re-used in the encoder 4, so that the decoding and re-encoding is as loss-less as possible. (There may be some loss because the DCT rounding process can cause the DCT process to be not transparent.)

Before the splice point, bitstream $B_0$ is also decoded in decoder B.

The processor P has sufficient storage (not shown) associated with decoders A and B to store for example 30 compressed frames.

A splice point SPLICE is chosen. At the splice point switch S2 selects the decoder B and decoded bitstream B is fed via the encoder 4 to the contact C of switch S1. In the example of FIGS. 1 and 7, full recoding, that is without re-use of the MPEG parameters, begins on the bitstream $A_0$ 5 frames before the splice point SPLICE. The reason for this will be explained below. After the splice, bitstream $A_0$ is irrelevant except that some frames of $A_0$ after the splice may be needed to decode frames of $A_0$ occurring before the splice.

After the splice point SPLICE, the bitstream $B_0$ is fully recoded for a transition period during which VBV_lock is achieved as will be explained below. Once VBV_lock is achieved, recoding of bitstream $B_0$ continues but with re-use of the MPEG parameters derived from the original bitstream $B_0$.

After a short interval of recoding of $B_0$ with re-use of the MPEG parameters, switch S1 selects contact $B_0$ and thus the original bitstream $B_0$, by-passing the decoder B and encoder C.

SECOND EXAMPLE

Figure 6A:
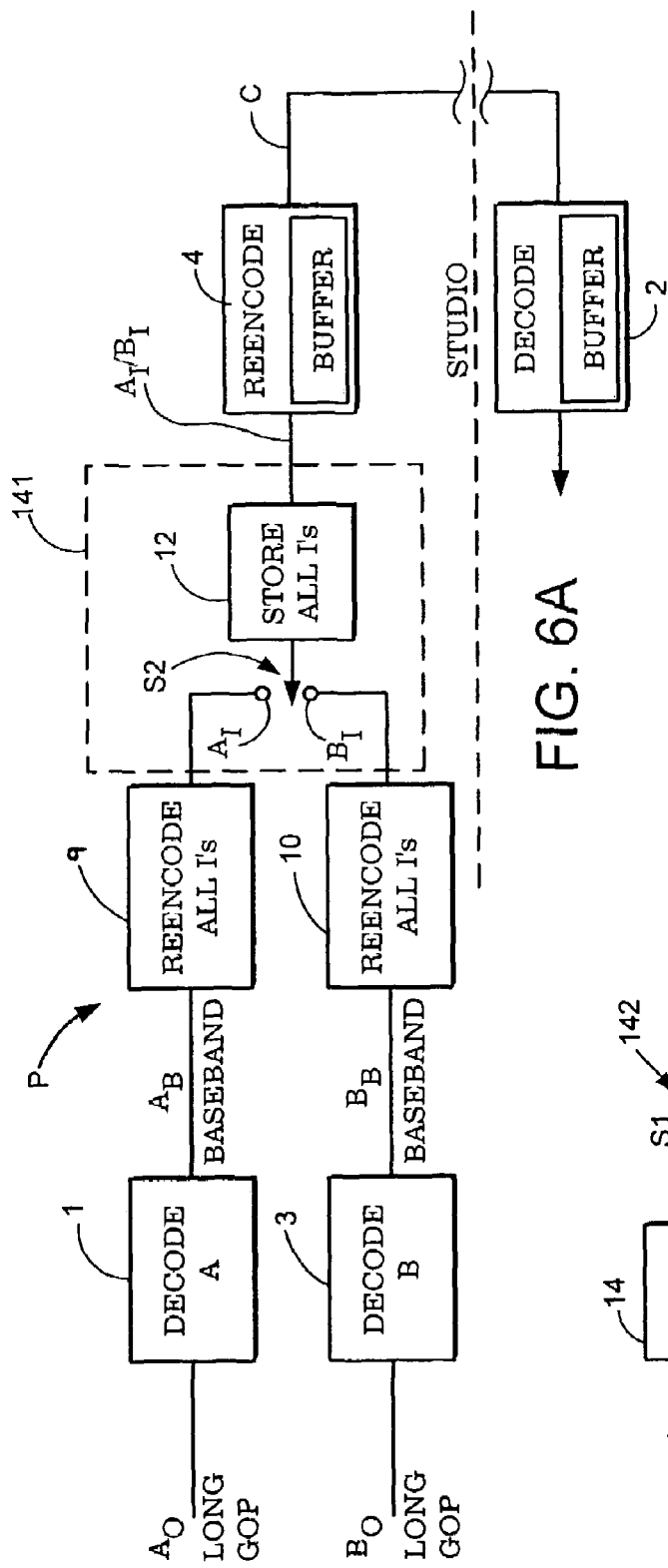
FIG. 6A is a schematic block diagram of an illustrative signal processor according to the invention and operating as illustrated in FIGS. 4 and 5.

Referring to FIGS. 4, 6A and 7, two first generation (Gen1) bitstreams $A_0$ and $B_0$ are MPEG-2 encoded with GOPs comprising 12 frames. In this example the bitstreams $A_0$ and $B_0$ have the same GOP structure:

IBBPBBPBBPBB as shown in FIG. 7. However the bitstreams may have any other GOP structure allowed by MPEG-2. The two bitstreams $A_0$ and $B_0$ may have different GOP structures. For ease of explanation it is assumed the bitstreams $A_0$ and $B_0$ have the same GOP structure as shown in FIG. 7.

It is desired to replace bitstream $A_0$ by bitstream $B_0$. As shown in FIGS. 4 and 6A, initially $A_0$ and $B_0$ are decoded in decoders 1 and 3. The decoded bitstreams are recoded in recoders 9 and 10 as second generation (Gen2) bitstreams $A_I$ and $B_I$. When decoding and recoding $A_0$ and $B_0$ as $A_I$ and $B_I$, the MPEG parameters of all frames of the original bitstreams $A_0$ and $B_0$ are retained in association with the recoded corresponding frames of $A_I$ and $B_I$. I frames of $A_0$ and $B_0$ are recoded as I frames of the bitstreams $A_I$ and $B_I$ using the same parameters they had in $A_0$ and $B_0$. P and B frames of $A_0$ and $B_0$ are recorded as I frames in $A_I$ and $B_I$ but their original MPEG parameters are retained. The MPEG parameters are retained in the recoded bitstream $A_I$, $B_I$ as, for example, user data.

When an operator decides to splice the recoded bitstreams $B_I$ and $A_I$, the operator operates the switch S2 so that $A_I$ is routed to a store 12 up to the splice point and $B_I$ is routed to the store 12 after the splice point, so that store 12 stores the spliced bitstream $A_I$/Bi with a splice point between the a frame of $A_I$ and a frame of $B_I$.

The spliced bitstream $A_I$/$B_I$ is decoded to base band and re-encoded in an encoder 4 as a third generation bitstream (Gen3) GOP C of the form shown in FIG. 7.

Figure 6B:
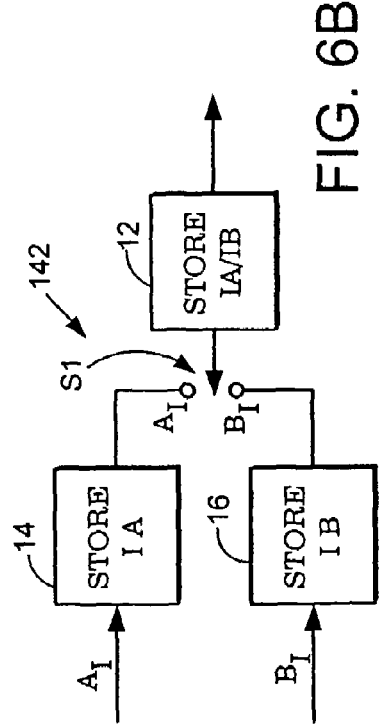
FIG. 6B shows a modification of FIG. 6A.

In a preferred embodiment shown in FIG. 6B the bitstreams are stored in respective stores 14 and 16 upstream of the switch S2 before they are spliced. The spliced bitstream $A_I$/$B_I$ is stored in another store 12. The stores 14, 16 and 12 may be digital Video Tape Recorders, disc recorders and/or I frame servers for example.

Referring to FIG. 4 the splice point SPLICE is indicated. At the splice point switch S2 switches from, for example, bitstream $A_I$ to bitstream $B_I$. When the spliced bitstreams are to be re-encoded they are fed to the encoder 4. In the example of FIGS. 4, 6 and 7, full recoding, that is without re-use of the MPEG parameters, takes place in a transition region beginning on the bitstream $A_I$ 5 frames before the splice point SPLICE. The reason for this will be explained below.

Before the beginning of the transition region (i.e. more than 5 frames before SPLICE) the bitstream $A_I$ is recoded reusing the MPEG parameters derived from the original bitstream $A_0$.

After the splice point SPLICE, the bitstream $B_I$, is fully recoded for the remainder of the transition period during which VBV_lock is achieved as will be explained below. Once VBV_lock is achieved, recoding of bitstream $B_I$, continues but with re-use of the MPEG parameters derived from the original bitstream $B_0$.

The spliced and recoded bitstream C produced by processor P and encoder 4 are fed to a downstream decoder 2 where the bitstream C is decoded for display for example. Downstream decoder 2 may be in, for example, a domestic television receiver. Processor P may be in a studio.

In FIGS. 6A and 6B the spliced bitstream $A_I$/$B_I$ is stored in the I-frame store 12 before being recoded. A marker marking the splice point is recorded in the bitstream, for example in the user bits.

As shown in FIGS. 1 and 4, for both the first and second examples there is a transitional region which includes the splice point SPLICE during which the occupancy for the bitstream C is controlled to prevent under- and over-flow of the buffer of the downstream decoder 2.

The methods of control discussed in the following discussion apply equally to both examples. However, it will be appreciated that:

a) in the first example it is the original bitstreams $A_0$ and $B_0$ which are being re-encoded by the encoder 4; whereas b) in the second example it is the I frame bitstreams $A_I$ and $B_I$ which are being re-encoded by the encoder 4.

However, the re-encoding of the frames of the bitstreams $A_I$ and $B_I$ is dependent on corresponding frames of the bitstreams $A_0$ and $B_0$ from which they are derived. Thus, in the following reference is made only to the frames of the original bitstreams $A_0$ and $B_0$. The following discussion applies to the frames of the bitstreams $A_I$ and $B_I$ which correspond to the frames of the bitstreams $A_0$ and $B_0$, with the result that the effect of recoding is the same as if the bitstream had not been re-coded as I frames (apart from some losses due to the additional recoding and decoding to and from I frames).

Picture Type Decision

The splicing of bitstream $B_0$ to bitstream $A_0$ disrupts the GOP structure. Thus the following rules are applied.

The bit stream, in this example $A_0$, before the splice, is recoded so that:

(1) the last 'I' or 'P' frame before the splice is converted to 'P';

(2) if the last frame before the splice is a 'B' frame, it is converted to 'P'.

The bitstream, in this example $B_0$, after the splice is recoded so that:

(3) the first 'I' or 'P' frame after a splice is converted to 'I'; and (4) if the first GOP after the splice and after the application of rule (3) contains less than three 'P' frames, the 'I' frame of the subsequent GOP is converted to 'P', thereby changing the length of the GOP. In this example the GOP is lengthened.

A new transitional GOP begins with an I-frame immediately after the splice, and the new GOP is made longer than preceding (and succeeding) GOPs in the bitstream $B_0$. The new GOP is in effect a prediction of where VBV_lock is to be achieved. The application of these rules is shown in FIG. 7 at (1), (2), (3) and (4).

In FIG. 7

A is bitstream $A_0$,

B is bitstream $B_0$, and

C is the spliced bitstream at output C of encoder 4 as if the picture type decisions have not been made, and $C^1$ is the spliced bitstream at output C of encoder 4 with the picture type decisions applied to it.

By application of rule (2), the 'B' frame of $A_0$ immediately before the splice is converted to P. By application of rule (1) the I frame of $A_0$ before the splice is also converted to P.

By application of rule (3), the first 'P' frame of stream $B_0$ after the splice is converted to I in stream $C^1$.

By application of rule (4), the GOP of bitstream $B_0$ after the splice has (after conversion of its first P frame to I) less than 3 'P' frames. Therefore the next 'I' frame is converted to 'P'. Application of these rules gives a GOP which defines a predicted VBV_lock point as will be discussed below.

Rule 4 may be changed to ($4^1$).

($4^1$) If the first GOP after the splice contains only one 'P' frame, the frame types of the next GOP are altered from 'I' to 'P' and 'P' to 'I' to give two 'P' frames in a GOP. This results in two shorter GOPs between the splice point and VBV_lock.

Processing Order

FIG. 7 shows the frames of the bitstreams in the order in which they are displayed or would be displayed. FIG. 8 shows the order in which the frames are processed. For example, referring to FIG. 7 (Display Order) frame 0, 1 and 2 of bitstream A are shown in that order. Even though the B frames 0 and 1 would be displayed before I frame 2, they depend on I frame 2 to be decoded. Thus to decode them I frame 2 must precede the B frames as shown in FIG. 8. Likewise B frames 3 and 4 of FIG. 7 depend on P frame 5 of FIG. 7; thus in FIG. 8 P frame 5 of FIG. 7 becomes P frame 3 preceding the two B frames.

Constant bit rate

The example of the processor P of FIG. 3 or 6A or 6B, has a constant bit rate. The bitstreams $A_0$ $B_0$ have a fixed bit rate and the encoder 4 produces at output C a constant bit rate.

Downstream Decoder and Buffer

Figure 9:
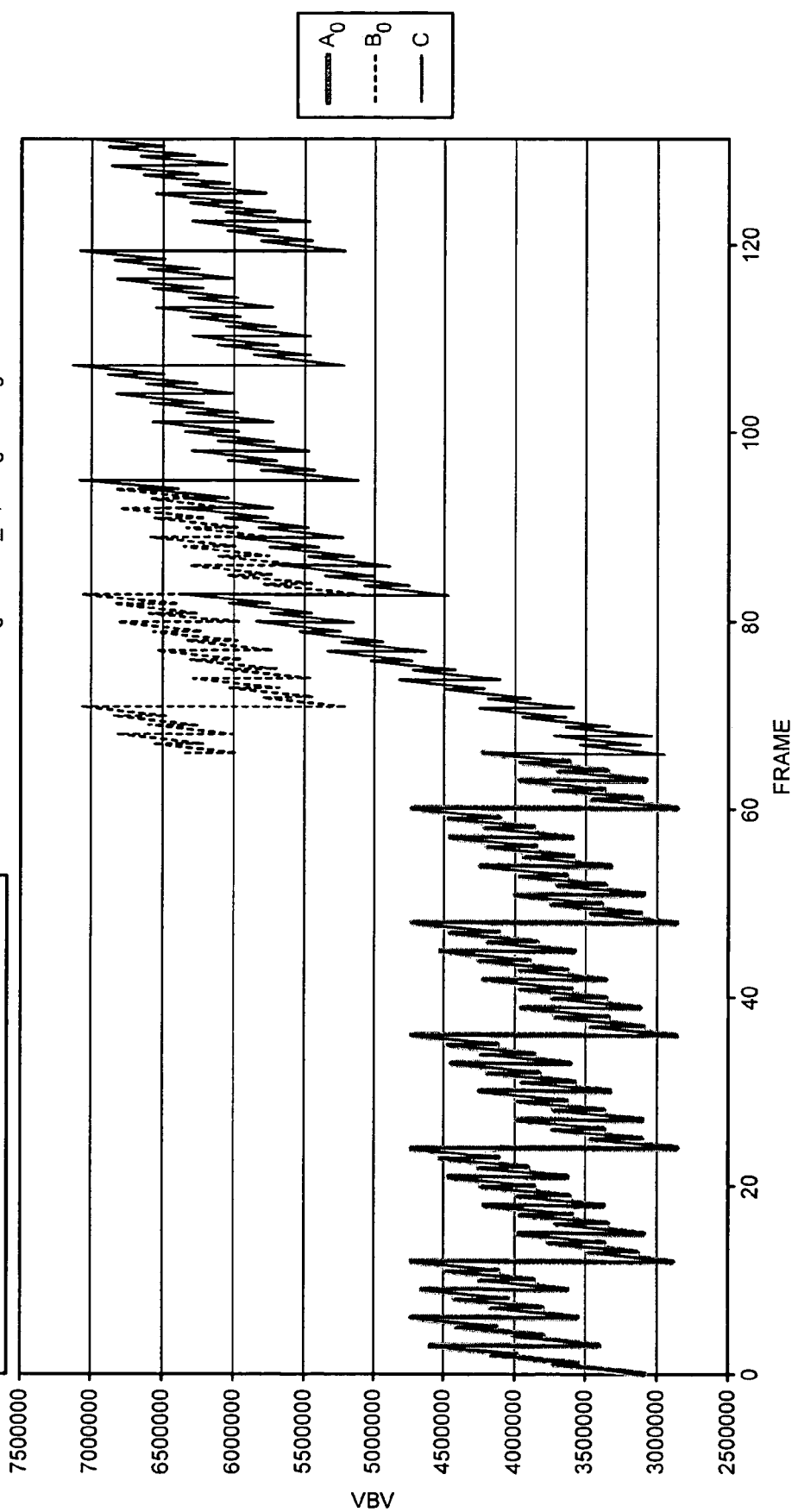
FIGS. 9 to 11 show illustrative values of VBV occupancy.
Figure 10:
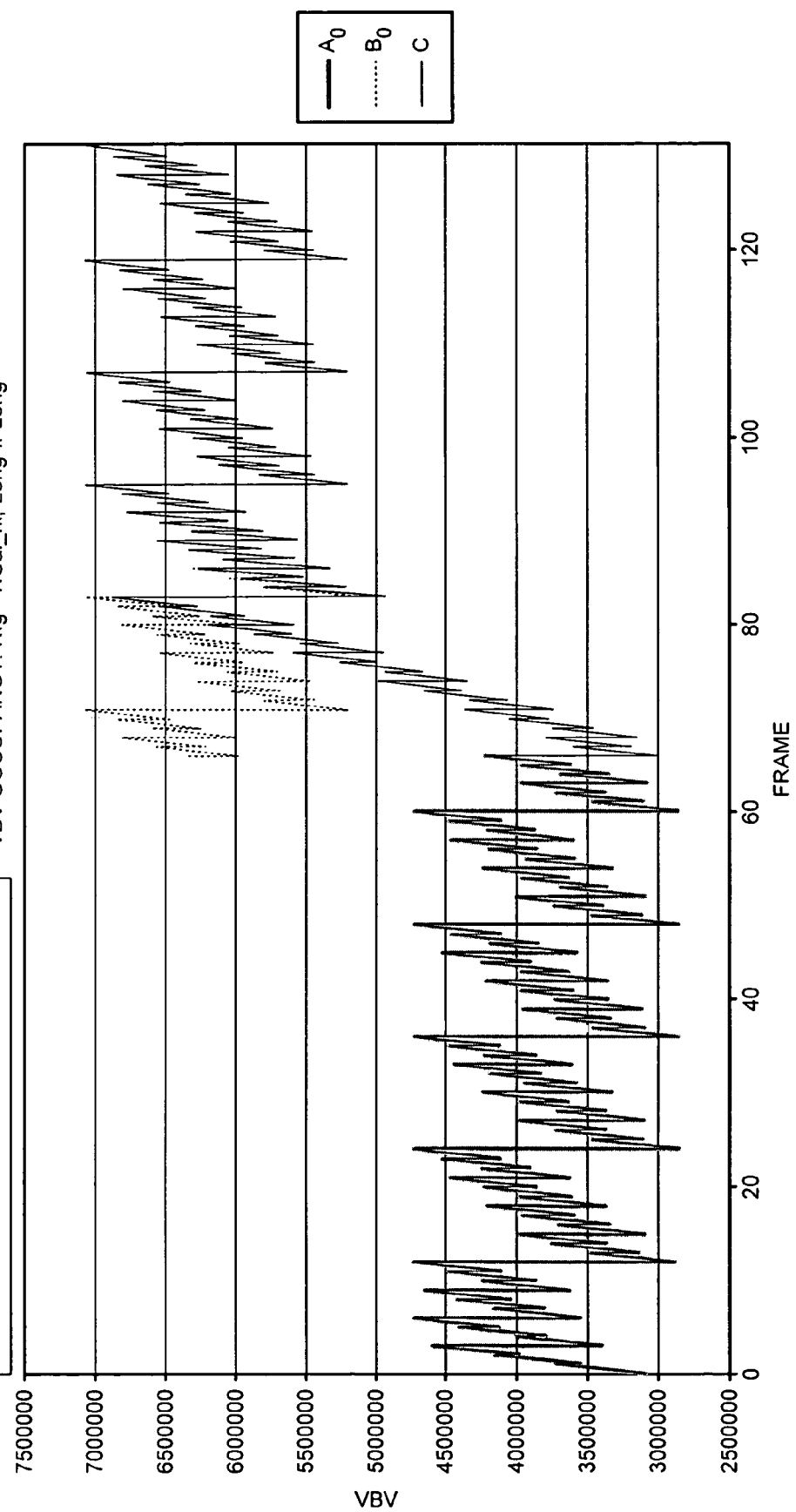
Figure 11:
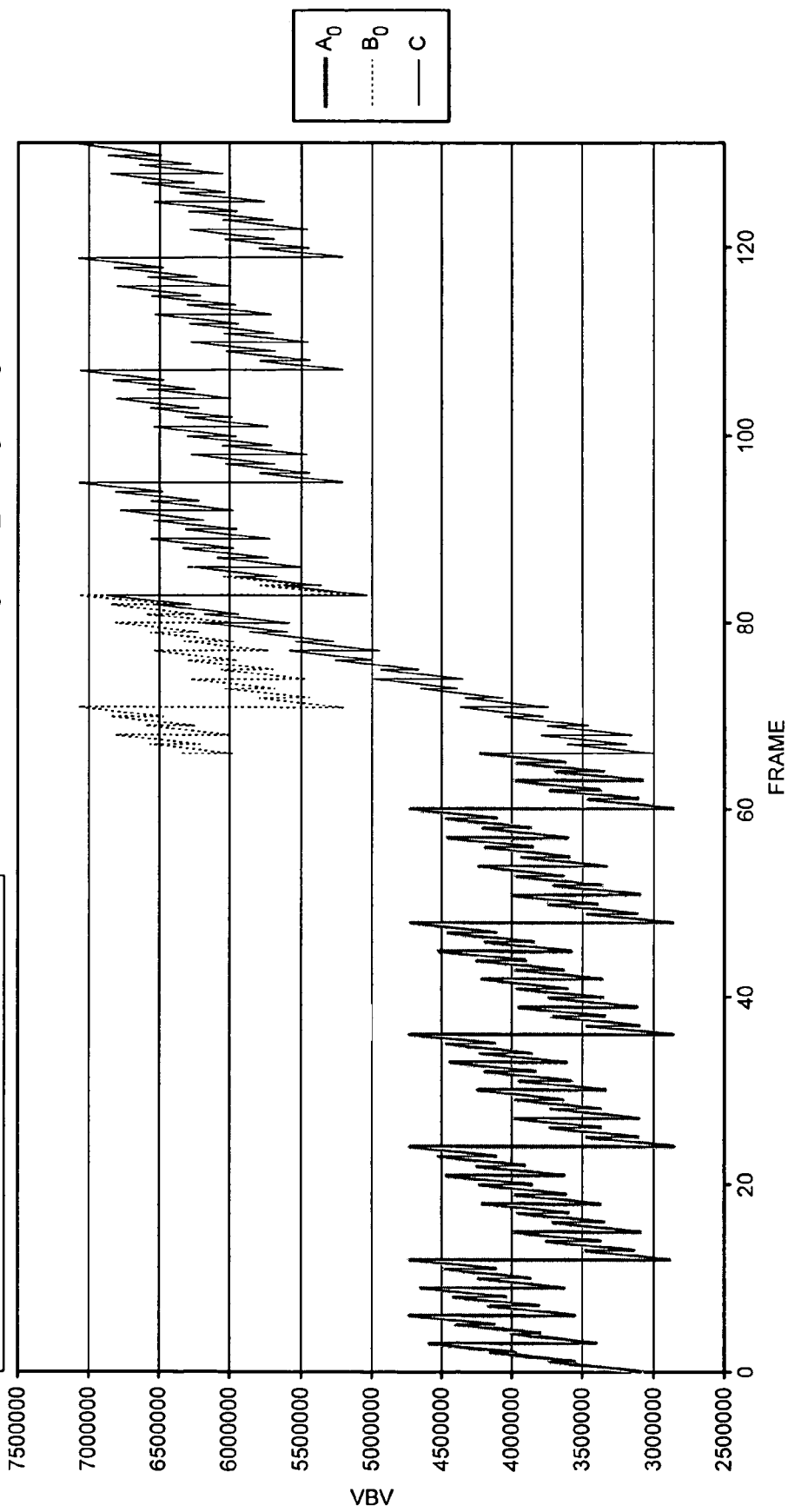

The downstream decoder 2 has a buffer 8. The encoding which takes place in encoder 4 of the processor is arranged so that the buffer 8 of the downstream decoder 2 neither underflows nor overflows. FIGS. 9, 10 and 11 show the operation of the downstream buffer 8 of the downstream decoder 2.

(The encoder 4 has a corresponding buffer and it operates as the inverse of what is shown in FIGS. 9, 10 and 11.)

The following are known MPEG rate control parameters.

VBV

VBV is virtual buffer verifier. It is a measure of the number of bits that would be in the downstream buffer 8.

Remain_bit_GOP

This is a target number for the total number of bits for the remainder of the current GOP. At the beginning of a GOP it is a target for the whole GOP. It reduces as the GOP progresses.

Complexity X, constants Kp, Kb and N, Np, Nb

Np is the number of pictures in a GOP.

Nb is the number of P frames remaining in a GOP.

Nb is the number of B frames remaining in a GOP.

Kp and Kb are 'universal' estimates dependent on quantisation matrices. They (indirectly) define the relative sizes of I, P and B frames.

Xi, Xp, Xb are "complexity measures" for I, P and B frames.

These parameters are used in a known manner to distribute the bits of a GOP amongst I, P and B frames.

They are further explained in "Test Model 5" published by "International Organisation for Standardisation Organisation Internationale De Normalisation Coded Representation of Picture and Audio Information ISO/IEC JTC1/SC29/WG11/N0400".

Achieving VBV_Lock

As discussed above, the downstream buffer must neither underflow nor overflow. In MPEG-2 the buffer is normally kept approximately half-full. A discontinuity in the bit stream can make the buffer underflow or overflow. VBV is the measure of buffer occupancy.

FIGS. 9, 10 and 11 show, as an extreme case, buffer occupancy VBV for two bitstreams $A_0$ and $B_0$. $A_0$ has a typical occupancy and $B_0$ has unusually high occupancy.

In the situation where the bitstream begins with A with typical occupancy, and B with high occupancy is spliced onto A at the splice point, it is necessary to provide, after the splice point, a transitional GOP or GOPs which:

a) provides continuity, albeit changing, of VBV occupancy; and b) changes the VBV occupancy from the value of stream A just before the splice to a target value which is the value of VBV for stream B.

As shown in FIGS. 9, 10 and 11, the VBV of bit stream C begins identical to A, then changes progressively towards the VBV of B.

The point at which the VBV occupancy of C becomes identical to that of stream B is the VBV_lock point.

As mentioned above FIGS. 9, 10 and 11 show occupancy of the downstream buffer 8. To achieve VBV_lock the encoder 4 is controlled as follows.

Methods of Achieving VBV Lock a) Picture Decision Rules

The methods use the picture decision rules (1) to (4) above.

b) Complexity

For the system of FIG. 3 stream A is decoded and re-encoded before the splice. Thus encoding occurs with complexity values appropriate to stream A. However, these values are not appropriate for stream B. Thus before the splice, complexity values $X_I$, $X_P$, $X_B$ of the I, P and B frames of stream B immediately before the splice are calculated based on $$X = S.Q$$

where X=complexity value
S=number of bits generated by encoding picture
Q=average quantisation parameter of all macroblocks in a picture.

X=S.Q is a standard equation for rate control in MPEG.

For the system of FIG. 6, because the bitstreams to be spliced $A_I$ and $B_I$, comprise only I-frames, the complexity estimates are derived as follows:

a) for P and B frames from the first generation transcoding parameters (which have been retained in association with the frames) of the I frames of the bitstream $B_I$, after the splice point; and b) for the I-frames from any I-frame of stream $B_I$, after the splice point. Preferably, the I-frame chosen is one which will be recoded as an I-frame in stream C.

These frames may be available at the splice point due to the 3-frame re-ordering delay. Otherwise a 3-frame delay may be provided.

In both systems, at the splice point these complexity values replace the existing values (of stream A). So after the splice complexity values appropriate to stream B are used. As discussed above, in the system of FIG. 6, the complexity values are derived from the stream B after the splice point.

The complexity values control the distribution of bits amongst I, P and B frames. Achieving good subjective quality is dependent on the complexity values.

c) Virtual Buffers Modification

The virtual buffers are used to calculate the reference Q scale for each macroblock. Improvement in quality can be gained by setting the virtual buffers to estimated stream B values at the splice point. This ensures that the resulting Q scales are similar to those used in stream B in the previous generation, instead of continuing with stream A Q scales.

For the system of FIG. 3 stream B virtual buffer values are estimated for the last I, P and B frames before the splice point, based on Q.

For the I frame, the value is calculated as:

$$\text{estimated\_buf\_i} = (Q*\text{bit\_rate})/(31*\text{frame\_rate}).$$

Q is the average quantisation parameter.

This value is then forced at the splice point.

This is also done for the P and B virtual buffers in same way.

For the system of FIG. 6 because the bitstreams to be spliced $A_I$ and $B_I$ comprise only I-frames, the virtual buffer estimates are derived using the value estimated_buf_i set out above but deriving its value as follows:

a) for P and B frames from the first generation transcoding parameters (which have been retained in association with the frames) of the I frames of the bitstream $B_I$. after the splice point; and b) for the I-frames from any I-frame of stream $B_I$ after the splice point. Preferably, the I-frame chosen is one which will be recoded as an I-frame in stream C.

The frames are available because they are stored, for example for the purpose of reordering the frames.

The encoding in encoder 4 is controlled in accordance with Remain-bit-GOP, between splice and VBV_lock so that the occupancy of the downstream buffer 2 follows a continuous but changing trajectory from before the splice at bitstream A occupancy to VBV_lock at the bitstream B occupancy. The control is also used to force the complexity and virtual buffers as described above. The control which does that is a 'rate control' and is known in for example from the paper "Test Model 5" mentioned above.

d) Adjust Remain bit GOP.

In order to increase occupancy of the downstream buffer as shown in FIG. 9, the buffer in the encoder is controlled in accordance with Remain_bit_GOP to output pictures with smaller numbers of bits, so that its occupancy decreases. Pictures with smaller numbers of bits are produced by increased compression/coarser quantisation.

If the trajectory is from high occupancy of the downstream buffer to lower occupancy of the downstream buffer, the encoder is controlled in accordance with the higher Remain_bit_GOP to increase occupancy of its buffer, producing larger pictures by less compression/finer quantisation.

Remain_bit_GOP is the target for the number of bits remaining in the GOP.

The length of the transitional GOP is known from the result of adjusting the GOP length using the picture decision rules (1) to (4) above.

Figure 12A:
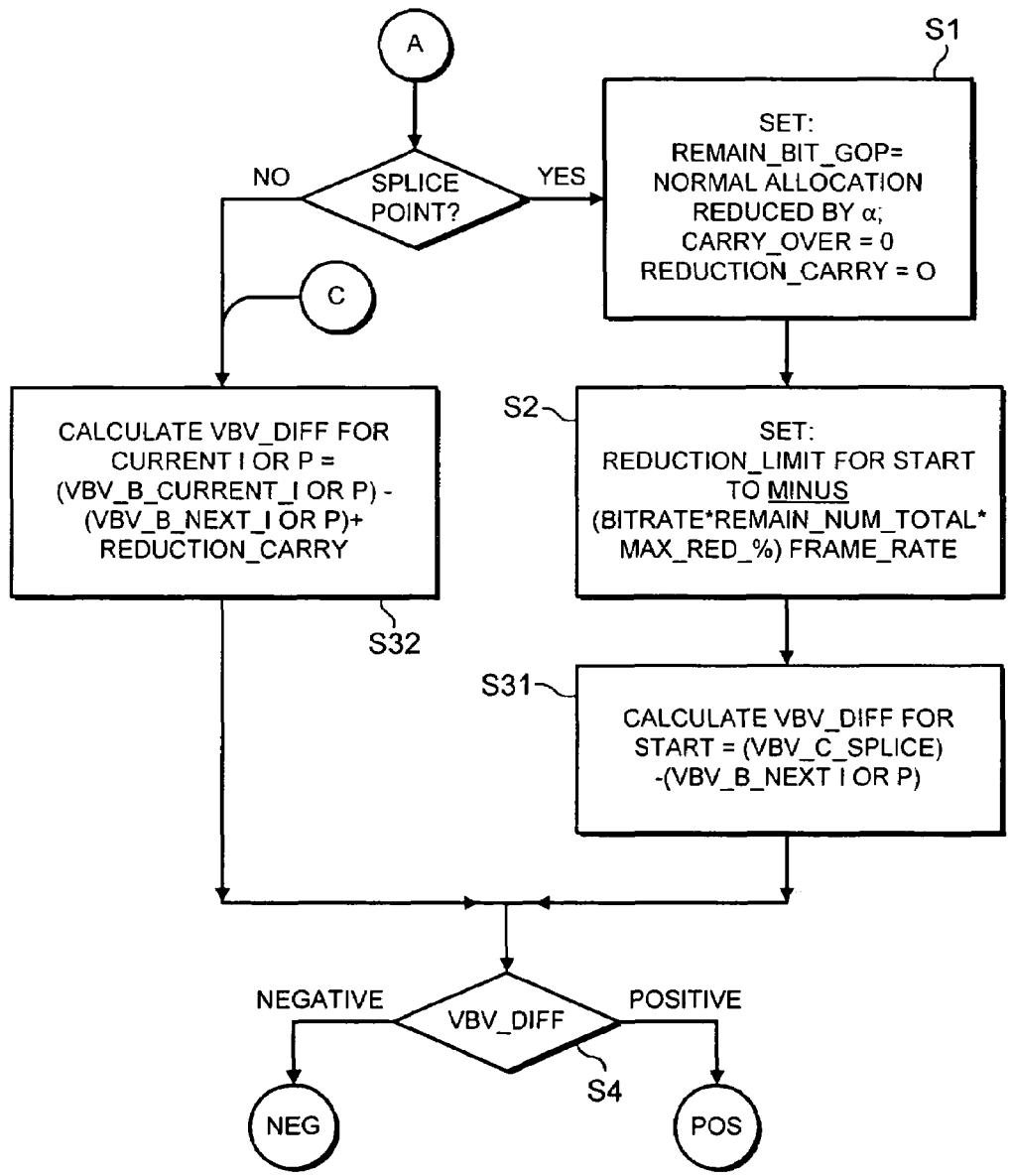
FIGS. 12A, B and C are a flow diagram illustrating an example of modification of occupancy in the transitional region.
Figure 12B:
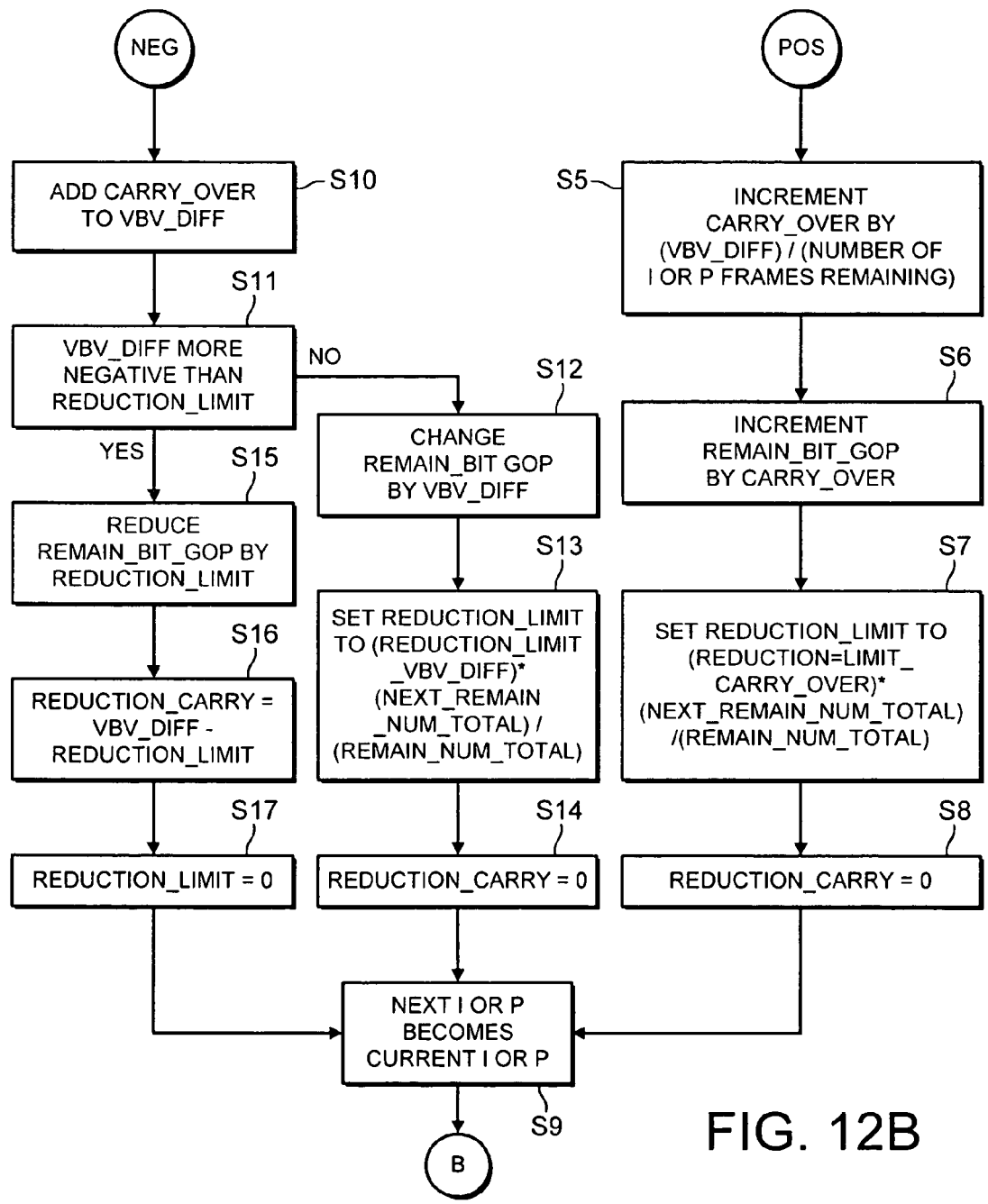
Figure 12C:
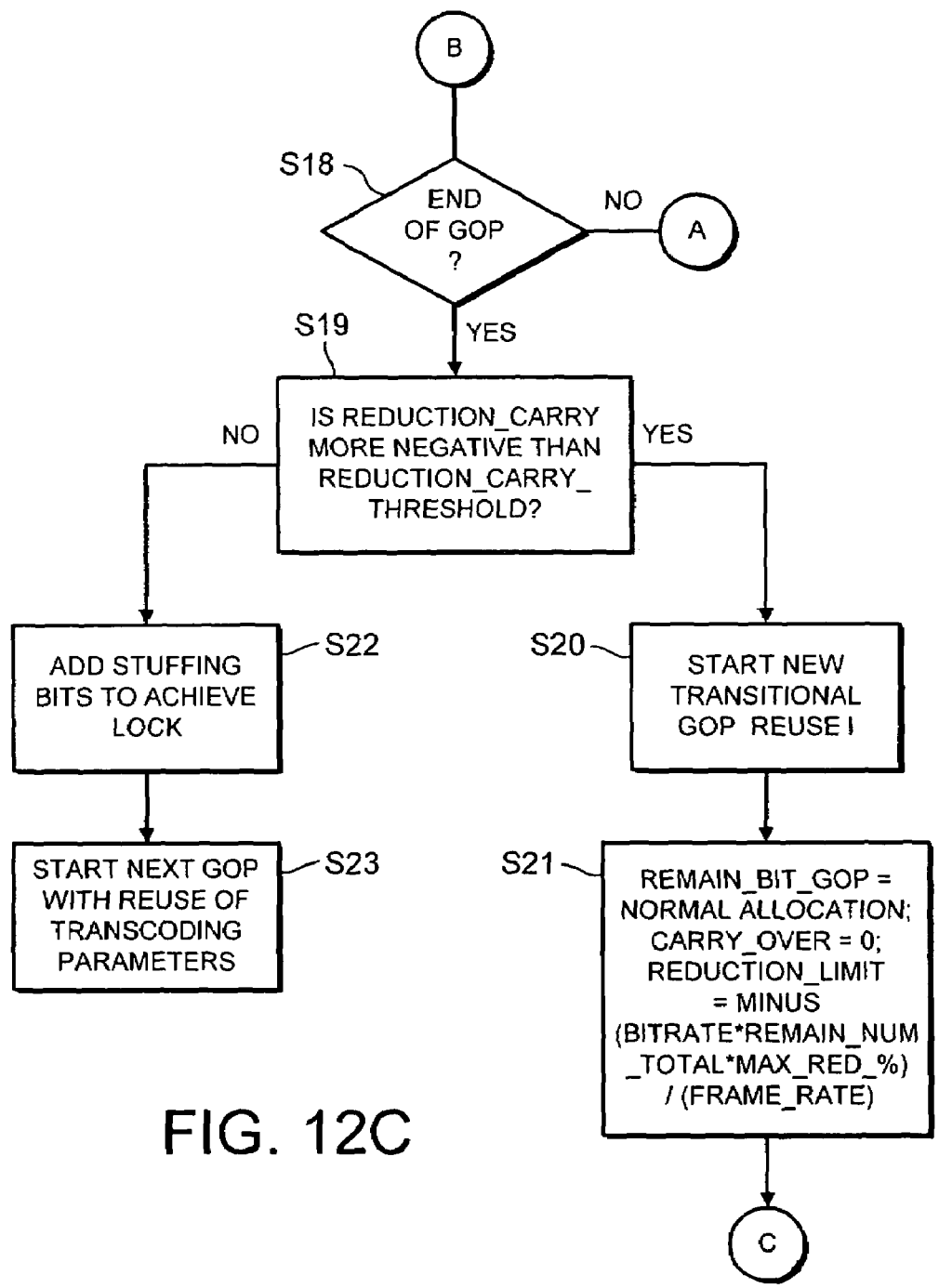

Remain_bit_GOP is adjusted in the following way. It is reduced after every frame by the number of bits used to encode that frame as is normal in MPEG2. In addition referring to FIGS. 12 A, B and C, it is updated at the start of the transitional GOP and on every I or P frame therein as described with reference to FIGS. 12 A to C.

At the splice point, Remain_bit_GOP is set to the normal allocation of bits for the transitional GOP defined by the picture decision rules, the allocation being preferably reduced by the factor α, a variable carry_over is set to zero and a variable reduction_carry is set to zero. [Step S1]. (Carry_over is a positive value of VBV_diff averaged over the remaining I and P frames of the GOP and reduction_carry is the excess of VBV_diff over the reduction_limit)

A variable Reduction_limit is initially set to $$\text{minus} \quad (\text{bitrate}*\text{remain\_num\_total}*\text{max\_red\_\%})/(\text{frame\_rate})$$

where remain_num_total is the number of frames remaining in the GOP, and max_red_ % is a number chosen empirically representing the desired maximum reduction in bit rate allowed during the transitional GOP. [StepS2]. Reduction_limit represents the maximum amount by which the bit rate may be reduced at any update on an I or P frame.

VBV_diff for the start of the transitional GOP is calculated as $$(\text{VBV\_C splice}) - (\text{VBV\_B\_next\_I or P})$$

i.e. as the difference between the VBV value of bit stream C at the splice point and the VBV value of the bitstream B at the immediately following I or P frame. [Step S31].

It is to be appreciated that reduction_limit is a negative number in this example. Also steps S1, S2 and S31 set up initial values used only at the start of the transitional GOP.

Referring to step S4, step S4 determines whether the initial value of VBV_diff at the start of the GOP is positive or negative as calculated by step S31. If the update is taking place on an I or P frame not at the start of the GOP then VBV_diff is calculated by step S32 as $$\text{VBV\_diff} = (\text{VBV\_B\_Current I or P}) - (\text{VBV\_B\_next I or P}) + \text{reduction\_carry}.$$

That is VBV_diff is updated by the difference between the current VBV value of the bitstream B and the next VBV_value (on an I or P frame) plus any reduction_carry.

Updates then take place in the following way which applies equally to the start of the GOP and to subsequent updates on an I or P frame.

VBV_diff positive at Step S4. (See FIG. 12B)

If VBV_diff is positive, then step S5 increments the variable carry_over by (VBV_diff)/(number of I or P frames remaining in the GOP) and step S6 increments Remain_bit_GOP by carry_over. Thus steps S5 and S6 average positive values of VBV_diff over the remaining I and P frames in the GOP. On each occasion there is a positive VBV_diff Remain_bit_GOP is incremented by carry_over.

Step S7 sets reduction_limit to: (Reduction_limit-carry_over)*(next_remain_num_total)/ (remain_num_total) where next_remain num total is the number of frames remaining in the GOP at the next update (at an I or P frame) including the next I or P frame and remain_num_total is the number of frames remaining in the GOP including the current frame. That is the negative value reduction_limit is increased by carry_over because the positive change in Remain_bit_GOP allows a bigger change in VBV at a subsequent update.

Step S8 sets reduction_carry to zero: reduction_carry is recalculated at each update on an I or P frame to avoid accumulation of its values.

VBV_diff negative at Step S4. (See FIG. 12B).

If VBV_diff is negative at step S4, then at step S10, the variable carry_over (which is the cumulative averaged positive value of VBV_diff from previous updates calculated at step S5) is added to VBV_diff to produce a new value of VBV_diff. That is carry_over is added to VBV_diff to make it less negative thus allowing a correspondingly bigger change to occur in Remain_bit_GOP because more bits are available. The result as tested at step S11 is that the new value of VBV_diff may be more or less negative than reduction_limit which is the maximum change allowed in Remain_bit_GOP.

If the new value of VBV_diff is more negative than reduction_limit then Remain_bit_GOP is reduced by reduction_limit [step S15]. Reduction_carry is calculated at step S16 as the excess of the new value of VBV_diff over the reduction_limit. Once reduction_limit has been exceeded in the GOP it is set to zero at step S17.

If the new value of VBV_diff is less negative than reduction_limit then at step S12 Remain_bit_GOP is changed by the value of VBV_diff. It will be appreciated that the new value of VBV_diff could be positive or negative in this case. If VBV_diff is positive Remain_bit_GOP is increased by VBV_diff and if VBV_Diff is negative Remain_bit_GOP is reduced by VBV_diff.

At step S13, the reduction_limit is set to:

(reduction_limit-VBV_diff)*
(next_remain_num_total)/
(remain_num_total)

where next_remain_num_total and remain_num_total are as defined for step S7. That is reduction_limit is:

reduced (i.e. made less negative) as the GOP progresses if VBV_diff is negative because fewer bits are available in the GOP; and (subject to the scaling effect of (next_remain_num_total)/(remain_num_total) increased (i.e. made more negative) if VBV_diff is positive because more bits are available in the GOP.

Reduction_carry is set to zero at step S14 for the same reason as at step S8.

The algorithm then proceeds to the next I or P update at step S9. If at step S18 the end of the transitional GOP as determined by the picture decision rules has not occurred then the procedure returns to step S32 and repeats until the end of the transitional GOP.

At the end of the GOP, step S19 determines whether reduction_carry is more negative than a threshold value reduction_carry_threshold. It will be appreciated that this will occur only if VBV_diff is more negative (after any positive offsetting by the cumulative value carry_over) than reduction_limit.

Reduction_carry less negative than the threshold indicates that VBV_lock can be achieved using stuffing bits as at step S22. The next GOP is then started with reuse of the transcoding parameters to maintain picture quality.

Reduction_carry more negative than the threshold indicates that VBV_lock has not been achieved and a new transitional GOP is started but with reuse of the I frame transcoding parameters and recoding of P and B frames. [Step S20]. For the new transitional GOP the following variables are set to initial values at the start of the GOP:

Remain_bit_GOP is set to its normal allocation. The length of the GOP is not determined by the picture decision rules but is determined as the normal length for a GOP. Carry_over is set to zero. Reduction_limit is set to minus (bitrate*remain_num_total*max_red_%)/
(frame_rate).

The value of reduction_carry from the previous GOP is carried over to the new GOP.

The procedure of updating Remain_bit GOP of steps S32 and S4 to S18 starts again until the occupancy of the transitional GOP equals that of the bitstream B. Preferably, the new transitional GOP reuses transcoding parameters for its I frames.

In one version, the threshold is set at zero. If reduction_carry is zero, the transitional GOP ends because VBV_lock is deemed to have occurred. If reduction_carry is not zero, full recoding continues in another GOP, which is a normal long GOP but according to the procedure of FIG. 12 until VBV_lock is achieved..

In another version, the threshold is set to a value K %. If reduction_carry is less than K then any difference between the VBVs of the transitional GOP and the bitstream B are small and are made up with stuffing bits. The spare stuffing bits are from the allocation of spare bits provided by reducing the normal allocation for Remain_bit_GOP by the factor α at the beginning of the GOP. The threshold K % is of the normal bit allocation for a long GOP. K may be in the range 0% to 8%, preferably about 5%. The maximum_reduction_percentage may be 25%.

The application of the reduction_limit ensures that during the transitional GOP the bit rate does not go below a predetermined minimum rate or equivalently the rate of change of occupancy does not exceed a predetermined maximum rate. Dividing positive changes in Remain_bit_GOP over the remainder of the I and P frames in the GOP tends to even out the changes in Remain_bit_GOP over the GOP. If VBV_diff is negative, but does not exceed the reduction limit, the limit is progressively reduced as the GOP proceeds. Thus the maximum change allowed reduces preventing disproportionately large changes in Remain_bit GOP at the end of the GOP. The method of FIG. 12 allows the transtion region beginning just before splice and ending at VBV_lock to be varied in length as necessary (as determined by reduction limit) so as to efficiently achieve VBV_lock.

VBV_Lock point

The period over which VBV_lock is predicted to be achieved is one (or more) GOP albeit a GOP the length of which may have been changed by the picture type decision rules. In this example it is about 30 frames.

Figure 5:
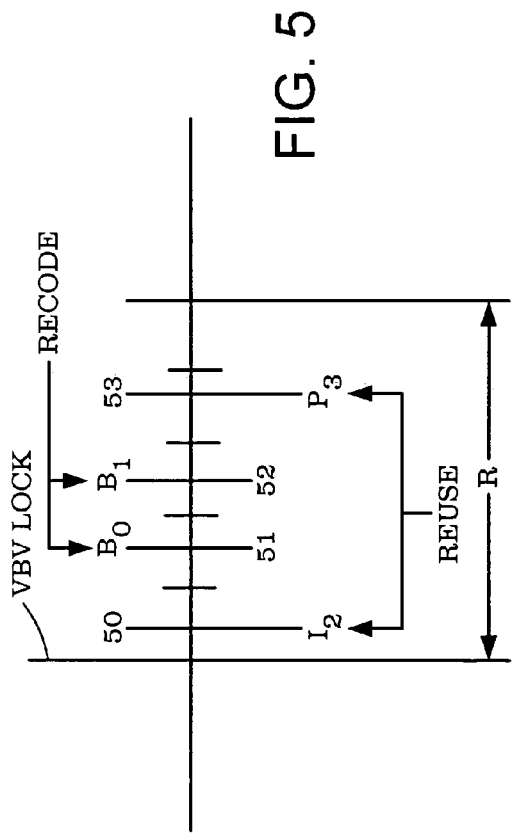
FIG. 5 illustrates a portion R of FIG. 4 in more detail.

Referring to FIGS. 2, 3, 4, 5 and 6, assume lock is achieved at I-frame 52 in display order (FIG. 4). In fact the VBV lock is achieved in the processing order so that it occurs at reordered I frame 50 (FIG. 5). The following B frames 51 and 52 in FIG. 5 are fully recoded frames from prior to VBV_lock and disturb the lock. Thus the spare bits are used at the second B frame 52 to stuff the bitstream to achieve exact lock.

If the factor $\alpha$ is zero, then no spare bits are available so the system attempts to achieve exact lock at the I frame immediately after the end of the transitional GOP. Rate control under or over steers producing usually too many bits. Even if exact lock is achieved, at the I frame, lock is disturbed at the B frames. So, Remain_bit-GOP is reduced by the factor $\alpha$ so rate control oversteers so that spare bits are available at the end of the GOP. The spare bits are used to achieve exact lock at the second B frame.

The I-frame 50 is processed by reusing its parameters derived from the original bitstream $B_0$. In the system of FIG. 6, after the fully recoded B frames 51 and 52, re-use of parameters resumes. In the system of FIG. 3, the recoding with reuse resumes until the original bitstream is directed directly to the output of the processor bypassing the decoding and re-coding.

Motion Vectors

Motion vectors are regenerated for the transitional GOP. Alternatively motion vectors could be estimated from vectors in neighbouring frames.

Bit growth on frames outside transition region

In the system of FIG. 6, the VBV values of the recoded frames are only approximately the same as their original forms because the number of bits may shrink or grow in the course of decoding and recoding.

The frames outside the transition region are originally encoded as long GOPs, decoded to baseband recoded as I frames, decoded to baseband and recoded as log GOPs. In these processes, the transcoding parameters of the original encoding are re-used to maintain maximum quality. However the DCT and inverse DCT (IDCT) processes are not transparent, i.e. errors occur. In addition, the original baseband is not the same as the decoded I frames due to quantization effects. As a result the number of bits in the frames can shrink or grow. If the shrinkage or growth is large enough the buffers may over-or under-flow. Thus, the frames are monitored.

If excessive shrinkage occurs bit stuffing is used. If excessive growth occurs; frames are recoded. The bit stuffing and recoding is used to maintain occupancy within normal MPEG2 limits. Preferably recoding reuses the transcoding paramters of the I frames to maintain picture quality.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A signal processor for splicing a compressed bitstream $B_0$ to a compressed bitstream $A_0$, the bitstreams $A_0$ and $B_0$ comprising bits representing one or more pictures the signal processor comprising:

a decoder for decoding the bitstreams $A_0$ and $B_0$;

a switch coupled to the decoder for producing a spliced bitstream S, comprising data from bitstream $B_0$ spliced to data from bitstream $A_0$ at a splice point; and an encoder for re-encoding the spliced bitstream S to form a re-encoded spliced bitstream C for supply to a downstream decoder having a downstream buffer an occupancy of such a downstream buffer being dependent upon the number of bits with which pictures of the spliced bitstream S are re-encoded by the encoder, wherein the encoder is controlled over a transitional region to allocate a number of bits with which to re-encode a picture of the spliced bitstream S in the transitional region in dependence upon a target downstream buffer occupancy for the bitstream $B_0$) and a downstream buffer occupancy for the re-encoded spliced bitstream C, so that the downstream buffer occupancy of the downstream buffer varies over the transitional region from the downstream buffer occupancy for bitstream $A_0$ to the downstream buffer occupancy for bitstream $B_0$ according to a path in which the rate of change of downstream buffer occupancy is limited to a predetermined maximum rate.

2. A processor according to claim 1, wherein the occupancy within the transitional region is changed at predetermined intervals.

3. A processor according to claim 2, wherein the change at each interval is limited to a predetermined maximum amount.

4. A processor according to claim 1, wherein the compressed bitstreams $A_0$ and $B_0$ are compressed video bitstreams.

5. A processor according to claim 4, wherein the compressed bitstreams $A_0$ and $B_0$ are compressed according to MPEG2.

6. A processor according to claim 1, wherein the switch supplies to the encoder a spliced bitstream S comprising decoded bitstream $B_0$ spliced to decoded bitstream $A_0$.

7. A processor according to claim 6, wherein the bitstreams comprise Groups of Pictures (GOPs) having at least I and P frames, wherein a transitional GOP is, produced by recoding the bitstream $B_0$ after the splice point to form the re-encoded spliced bitstream C so that the re-encoded spliced bitstream C has a) an I frame at the beginning of the transitional GOP following the splice point, and, in addition to the said I frame, b) at least three P frames.

8. A processor according to claim 6, wherein the transitional region comprises a portion before the splice point produced by modifying bitstream $A_0$ to form the re-encoded spliced bitstream C so that a) the last I or P frame before the splice point is converted to a P frame, and b) if the last frame of bitstream $A_0$ before the splice is a B frame, it is converted to a P frame.

9. A processor according to claim 6, wherein the transcoding parameters of at least the I frames of the bitstreams A0 and B0 are reused when recoding the corresponding frames of the spliced bitstream S at least outside the transitional region.

10. A processor according to claim 9, wherein the transcoding parameters of all frames of the bitstreams A0 and B0 are reused when recoding the corresponding frames of the spliced bitstream S outside the transitional region.

11. A processor according to claim 1, further comprising a re-encoder for re-encoding the decoded bitstreams $A_0$ and $B_0$ as bitstreams $A_I$ and $B_I$, respectively comprising only I frames, the encoder re-encoding the bitstreams $A_I$ and $B_I$ to form the re-encoded spliced bitstream C.

12. A processor according to claim 11, wherein the bitstreams comprise Groups of Pictures (GOPs) having at least I and P frames, wherein a transitional GOP is produced by recoding the bitstream $B_I$, after the splice point to form the re-encoded spliced bitstream C so that the re-encoded spliced bitstream C has
  a) an I frame at the beginning of the transitional GOP following the splice point, and, in addition to the said I frame,
  b) at least three P frames.

13. A processor according to claim 11, wherein the transitional region comprises a portion before the splice point produced by modifying stream $A_I$ to form the re-encoded spliced bitstream C so that referring to the frames of bitstream $A_0$ corresponding to the frames of bitstream $A_I$
  a) the last '$I_0$' or '$P_0$' frame before the splice point is converted to a P frame, and
  b) if the last frame of bitstream $A_0$ before the splice point is a B frame, it is converted to a P frame.

14. A processor according to claim 11, wherein the transcoding parameters of at least the I frames of the bitstreams $A_0$ and $B_0$ are reused when recoding the corresponding frames of the spliced bitstream S at least outside the transitional region.

15. A processor according to claim 14, wherein the transcoding parameters of all frames of the bitstreams $A_0$ and $B_0$ are reused when recoding the corresponding frames of the spliced bitstream S at least outside the transitional region.

16. A processor according to claim 6, wherein the encoder calculates for a transitional GOP after the splice point a target number of bits Remain_bit_GOP for the GOP, and controls the occupancy of the downstream buffer by re-encoded spliced bitstream C within the transitional GOP in dependence upon Remain_bit_GOP and limits the rate of change of occupancy of said downstream buffer to the said predetermined maximum rate.

17. A processor according to claim 16, wherein Remain_bit_GOP is recalculated at regular intervals.

18. A processor according to claim 17, wherein the said regular intervals 5 are every 3 frames, at frames of the transitional GOP corresponding to I frames and/or P frames of the bitstream $B_0$ after the splice point.

19. A processor according to claim 18, wherein at the beginning of the transitional GOP, Remain-bit-GOP is calculated as an initial value which is the normal allocation of bits calculated for the transitional GOP.

20. A processor according to claim 19, wherein at the beginning of the transitional GOP, the normal allocation is reduced by a factor α where α is less than one.

21. A processor according to claim 19, wherein a value VBV_diff is calculated in respect of the splice point where VBV diff is dependent on the difference between the values of occupancy of re-encoded spliced bitstream C at the splice point and the occupancy of bitstream $B_0$ at a frame adjacent the splice point.

22. A processor according to claim 21, wherein subsequently at the said regular intervals the value VBV_diff is dependent on the difference between the occupancy of bitstream $B_0$ at the current frame of the transitional GOP and the occupancy of bitstream $B_0$ at the next interval is calculated.

23. A processor according to claim 21, wherein if VBV diff is positive Remain_bit_GOP is incremented at each recalculation thereof by a value carry_over=(VBV_diff)/(number of recalculation intervals remaining in the GOP).

24. A processor according to claim 23, wherein carry over is added to VBV_diff on each recalculation of VBV_diff.

25. A processor according to claim 21, wherein if VBV_diff is negative, but is not more negative than a limit value, then Remain_bit_GOP is reduced by VBV_diff.

26. A processor according to claim 25, wherein the limit value is reduced by a value proportional to VBV_diff.

27. A processor according to claim 26, wherein the limit value is reduced by VBV_diff*R, where R is a predetermined value less than one.

28. A processor according to claim 27, wherein R is the number of recalculation intervals remaining in the GOP divided by the total number of recalculated intervals in the GOP.

29. A processor according to claim 24, wherein if VBV_diff is more negative than the limit value, Remain_bit_GOP is reduced by the limit value.

30. A processor according to claim 29, wherein a value reduction_carry equal to the excess of VBV_diff over the limit value is calculated.

31. A processor according to claim 25, wherein once reduction limit exceeds the limit value, the limit value is set to zero for the remainder of the transitional GOP.

32. A processor according to claim 28, wherein if the value of reduction_carry at the end of the transitional GOP is greater than a threshold value, then in the following GOP the occupancy of the downstream buffer is controlled in dependence upon Remain_bit_GOP until the value of reduction_carry equals or is less than the threshold value.

33. A processor according to claim 32, wherein the said threshold is zero.

34. A processor according to claim 32, wherein the said threshold is K*(normal allocation of bits in a GOP), where 0<K<1.

35. A processor according to claim 34, wherein 0<K<0.1, preferably 0.01.

36. A processor according to claim 32, wherein if reduction_carry is less than the threshold but the occupancy of re-encoded spliced bitstream C does not equal that of compressed bitstream $B_0$, additional bits are added to re-encoded spliced bitstream C to achieve equality.

37. A signal processor for splicing a compressed bitstream $B_0$ to a compressed bitstream $A_0$, each bitstream comprising groups (GOPs) of I and P and/or B frames, the signal processor comprising:
  a decoder for decoding the bitstreams $A_0$ and $B_0$;
  a switch switching means (S2) coupled to the decoder for producing a spliced bitstream S, comprising data from bitstream $B_0$ spliced to data from bitstream $A_0$ at a splice point; and
  an encoder for re-encoding the spliced bitstream S to form a re-encoded spliced bitstream C for supply to a downstream decoder having a downstream buffer, wherein the encoder is controlled over a transitional region so that the occupancy of the downstream buffer varies over the transitional region from the occupancy of bitstream $A_0$ to the occupancy of bitstream $B_0$,
  the transitional region includes a transitional GOP extending from the splice point and of a length which is an initial prediction of the point in bitstream $B_0$ at which the occupancy of re-encoded spliced bitstream C equals that of bitstream $B_0$, and occupancy is changed at regular intervals in the GOP according to a trajectory so as to make the occupancy of re-encoded spliced bitstream C equal to that of bitstream $B_0$ by the end of the GOP, a limit is applied to a change according to the trajectory which increases occupancy, and the amount by which the change would exceed the limit (if it were not limited) is compared at the end of the GOP with a threshold and, if it exceeds the threshold, the transitional region is extended.

38. A system according to claim 37, wherein the limit is progressively reduced as the GOP progresses.

39. A system according to claim 38, wherein the limit is progressively reduced provided it is not exceeded.

40. A system according to claim 37, wherein a change which reduces occupancy at one of the said intervals is averaged over the remainder of the GOP.

* * * * *